United States Patent
Takeyama

(10) Patent No.: US 9,722,263 B2
(45) Date of Patent: Aug. 1, 2017

(54) FUEL CELL AND FUEL CELL SYSTEM

(71) Applicant: TOYOTA JIDOSHA KABUSHIKI KAISHA, Toyota-shi, Aichi-ken (JP)

(72) Inventor: Makoto Takeyama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/939,410

(22) Filed: Nov. 12, 2015

(65) Prior Publication Data

US 2016/0141662 A1     May 19, 2016

(30) Foreign Application Priority Data

Nov. 14, 2014   (JP) ................. 2014-231668

(51) Int. Cl.
| | | |
|---|---|---|
| *H01M 8/04* | (2016.01) | |
| *H01M 8/04082* | (2016.01) | |
| *H01M 8/2483* | (2016.01) | |
| *H01M 8/2484* | (2016.01) | |
| *H01M 8/0239* | (2016.01) | |
| *H01M 8/1018* | (2016.01) | |

(52) U.S. Cl.
CPC ..... *H01M 8/04201* (2013.01); *H01M 8/2483* (2016.02); *H01M 8/2484* (2016.02); *H01M 8/0239* (2013.01); *H01M 2008/1095* (2013.01); *H01M 2250/20* (2013.01); *Y02T 90/32* (2013.01)

(58) Field of Classification Search
CPC ........... H01M 8/04201; H01M 8/0239; H01M 8/2484; H01M 2008/1095; H01M 8/2483
See application file for complete search history.

(56) References Cited

U.S. PATENT DOCUMENTS

| | | | | |
|---|---|---|---|---|
| 2009/0017355 A1* | 1/2009 | Kawabata | ........... | H01M 8/0258 429/483 |
| 2013/0017470 A1 | 1/2013 | Hotta et al. | | |
| 2014/0134510 A1* | 5/2014 | Kawabata | ............. | H01M 8/242 429/437 |

FOREIGN PATENT DOCUMENTS

WO   WO 2013-008315   2/2015

* cited by examiner

*Primary Examiner* — Mark F Huff
*Assistant Examiner* — Monique Wills
(74) *Attorney, Agent, or Firm* — Finnegan, Henderson, Farabow, Garrett & Dunner, LLP

(57) ABSTRACT

An object is to suppress interference with the flow of a reactive gas or an off-gas in a fuel cell. There is provided a fuel cell comprising a stacked body that includes at least a power generation body configured by stacking a plurality of unit cells; and an end plate that is placed on at least one end in a stacking direction of the stacked body. The stacked body includes a manifold that is formed to pass through at least the power generation body in the stacking direction and is configured to cause a reactive gas or an off-gas to flow through. The end plate comprises a through hole that is formed to communicate with the manifold; and a plate portion that is placed inside of the through hole at a position corresponding to an outer circumference of an opening of the manifold formed in an end face on the one end of the stacked body and is arranged away from the end face of the stacked body across a clearance.

8 Claims, 9 Drawing Sheets

FUEL CELL AND FUEL CELL SYSTEM

CROSS-REFERENCE TO RELATED APPLICATIONS

The present application claims priority to Japanese patent application P2014-231668 filed on Nov. 14, 2014, the entirety of disclosure of which is hereby incorporated by reference into this application.

BACKGROUND

Field

The present invention relates to a fuel cell.

Related Art

A known configuration of a fuel cell has end plates placed on both ends of a stacked body configured by stacking a plurality of unit cells. The end plate has supply holes that are configured to supply reactive gases and cooling water to the stacked body and discharge holes that are configured to collect the reactive gases and the cooling water from the stacked body and discharge the reactive gases and the cooling water out of the fuel cell (in the description hereinafter, the supply holes and the discharge holes may collectively be called supply and discharge holes). The supply and discharge holes formed in the end plate may have different opening shapes on a contact surface side that is in contact with the stacked body and on an opposite surface to the contact surface (in the description below, called end face) (WO 2013/008315).

SUMMARY

WO 2013/008315 discloses the configuration of an end plate in which a cathode gas outlet, port formed in the contact surface of the end plate is provided with a rib that is placed to divide the cathode gas outlet port in a short direction (hereinafter called first rib) and a rib that is placed to divide the cathode gas outlet port in a longitudinal direction (hereinafter called second rib). These first and second ribs cause a cathode gas flowing through a cathode gas discharge manifold provided in the stacked body to be subjected to flow rate regulation and distribution and to be discharged out of the fuel cell via a cathode gas outlet port formed in the end face of the end plate.

In the configuration of WO 2013/008315, the first rib is arranged at a position that is in contact with the outer circumference of the manifold formed to pass through the stacked body (i.e., placed very close to the outer periphery of the manifold). A compressive load is applied to the fuel cell in the stacking direction. The compressive load is likely to cause the first rib to enter the manifold and thereby interfere with the flow of the cathode gas.

In the fuel cell, water is produced on the cathode side during power generation, and the produced water is included in the cathode off-gas. The produced water in the cathode off-gas may be present in the form of liquid water. For example, in a fuel cell system mounted on a vehicle, inclination of the fuel cell system during a run of the vehicle may cause the liquid water to flow back into the stacked body and flow into a unit cell. This may result in blocking a cathode gas flow path in the unit cell. In the configuration that the ribs are provided in the cathode gas outlet port like WO 2013/008315, a draft angle is set for the ribs for the purpose of facilitating manufacture. This is more likely to cause the back flow of liquid water.

In the configuration of WO 2013/008315, the first rib is in contact with a terminal plate. The first rib is made of a resin. It is difficult to provide an end of the first rib (contact portion of the terminal plate) with sufficient plane accuracy. This is likely to cause a variation in surface pressure of the unit cell at a place where the first rib is in contact with the terminal plate.

In order to solve at least part of the above problems, the invention may be implemented by any of the following aspects.

(1) According to one aspect of the invention, there is provided a fuel cell comprising a stacked body that includes at least a power generation body configured by stacking a plurality of unit cells; and an end plate that is placed on at least one end of the stacked body in a stacking direction. In the fuel cell of this aspect, the stacked body may include a manifold that is formed to pass through at least the power generation body in the stacking direction and through which a reactive gas or an off-gas flows. The end plate may comprise a through hole that is communication with the manifold; and a plate portion that is placed inside of the through hole at a position corresponding to an outer circumference of an opening of the manifold formed in an end face of the one end of the stacked body and is arranged away from the end face of the stacked body across a clearance.

In the fuel cell of this aspect, the plate portion is arranged away from the end face of the stacked body across the clearance. Even when the plate portion is placed very close to the opening of the manifold formed in the stacked body, this configuration suppresses the plate portion from entering the manifold by a compressive load applied to the stacking direction of the fuel cell. As a result, this suppresses interference with the flow of the reactive gas. In the case where the reactive gas or the off-gas flowing through the manifold provided in the stacked body or the through hole provided in the end plate includes liquid water, this configuration causes the liquid water to be discharged via the clearance formed between the plate portion and the stacked body.

(2) In the fuel cell of the above aspect, the end plate may comprise at least one contact portion that is extended from the plate portion and includes a contact side face that is in contact with the end face of the stacked body. The contact side face may have a length that is shorter than length of the side face of the plate portion. This configuration causes the stacked body to be pressed by the contact portion, and thereby suppresses a decrease in surface pressure of the unit cell, compared with a configuration of the end plate without the contact portion. The length of the contact side face is shorter than the length of the side face of the plate portion. This configuration enhances the accuracy of manufacture, compared with a contact portion that has a contact side face having the same length as the length of the side face of the plate portion. Additionally, this configuration leaves the clearance between the plate portion and the stacked body and thereby allows liquid water to be discharged via the clearance.

(3) In the fuel cell of the above aspect, the end plate may comprise a plurality of the contact portions. The plurality of contact portions may respectively have an identical length of the contact side faces and may be arranged at equal intervals. In the fuel cell of this aspect, the contact portions that are in contact with the end face of the stacked body are arranged at equal intervals. This configuration causes a uniform surface pressure to be applied to the unit cell by the plurality of contact portions.

(4) In the fuel cell of the above aspect, the plate portion may be arranged at a position corresponding to a lower side in gravity direction of the outer circumference of the opening of the manifold. In the fuel cell of this aspect, the plate portion is located on the lower side in the gravity direction of the opening of the manifold. In the case where the reactive gas or the off-gas flowing through the manifold or the through hole includes liquid water, this configuration causes the liquid water to be dropped down by the gravitational force via the clearance formed between the plate portion and the stacked body and thereby to be readily discharged. As a result, this configuration suppresses the back flow of liquid water into the manifold and thereby suppresses a reactive gas flow path in the unit cell from being blocked.

(5) In the fuel cell of the above aspect, the off-gas flowing through the manifold may be a cathode off-gas. The cathode off-gas is likely to include water produced during power generation of the fuel cell, in the form of liquid water. Accordingly, the plate portion of the above configuration may be placed inside of the through hole that is formed to communicate with the manifold provided to cause the cathode off-gas to flow through. This configuration causes liquid water in the cathode off-gas to be discharged and thereby suppresses an oxidizing gas (cathode gas) flow path in the unit cell from being blocked.

The invention may be implemented by any of various aspects other than the fuel cell of the above aspects, for example, a fuel cell system and a moving body with the fuel cell system mounted thereon.

DESCRIPTION OF THE EMBODIMENTS

A. First Embodiment

A1. Configuration of Fuel Cell System

Figure 1:
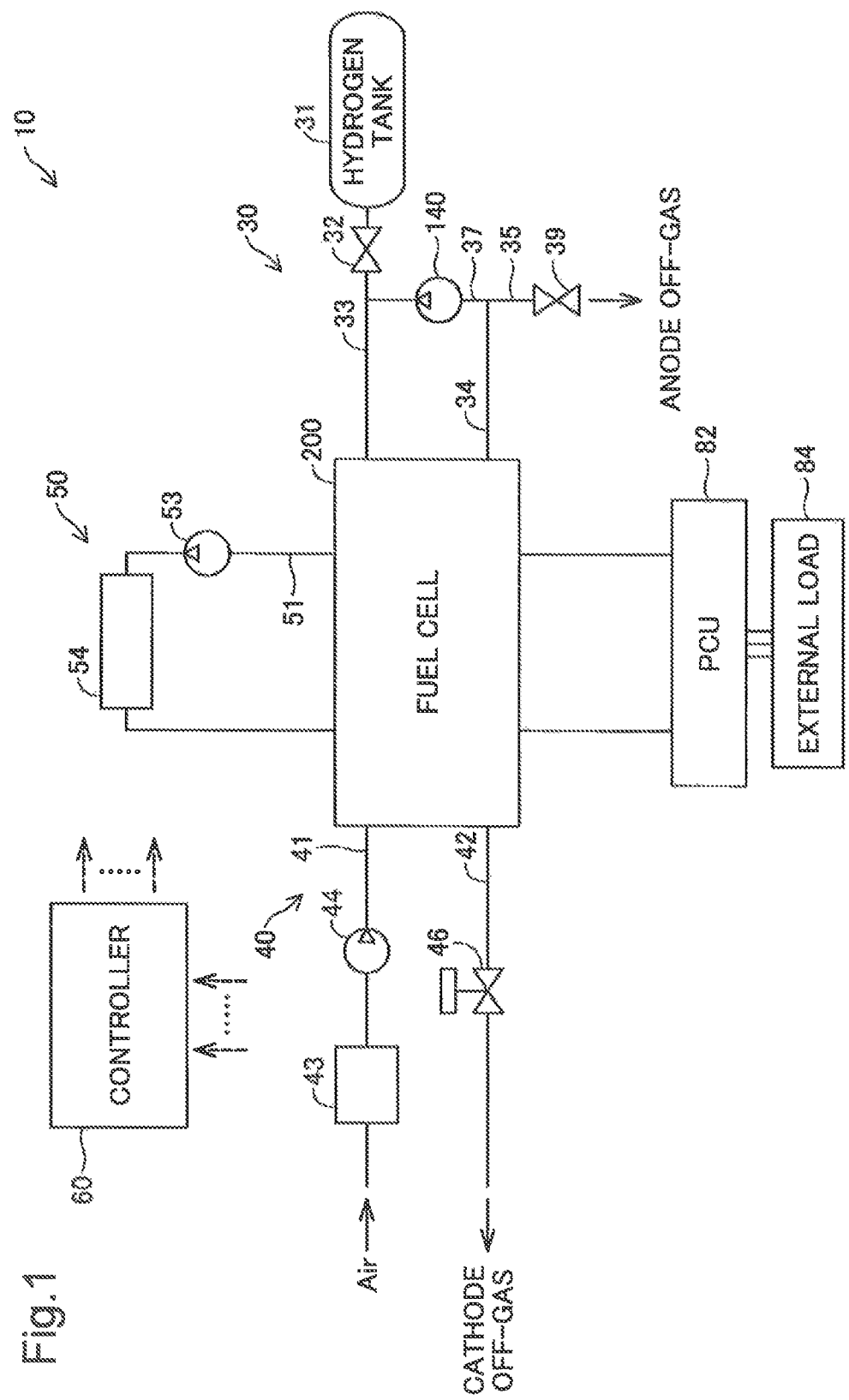
FIG. 1 is a diagram illustrating the schematic configuration of a fuel cell system according to one embodiment of the invention.

FIG. 1 is a diagram illustrating the schematic configuration of a fuel cell system 10 according to one embodiment of the invention. The fuel cell system 10 of the embodiment includes a fuel cell 200, a hydrogen supply-discharge system 30 configured to supply and discharge hydrogen as a fuel gas, an air supply-discharge system 40 configured to supply and discharge the air as an oxidizing gas, a cooling system 50 configured to cool down the fuel cell 200 and a controller 60 configured to control the fuel cell system 10.

The fuel cell 200 is a relatively small-size polymer electrolyte fuel cell having good power generation efficiency and is configured to obtain electromotive force through electrochemical reactions of pure hydrogen as the fuel gas and oxygen in the air as the oxidizing gas at respective electrodes. The fuel cell 200 has stacked structure by stacking a plurality of unit cells (not shown). The number of unit cells stacked may be set arbitrarily according to the output required for the fuel cell 200.

In the hydrogen supply-discharge system 30, hydrogen is released from a hydrogen tank 31 provided to store high-pressure hydrogen and is supplied to anodes of the fuel cell 200 through a piping 33 at a flow rate regulated by an injector 32. Anode off-gas is introduced into a piping 34, is subjected to separation of water by a gas-liquid separator (not shown) and is returned to the piping 33 via a piping 37. The water in the anode off-gas separated by the gas-liquid separator is discharged through a piping 35 to the atmosphere. A shutoff valve 39 is provided on the piping 35 and is opened to discharge the water in the anode off-gas. A hydrogen pump 140 is provided on the piping 37 to regulate the circulation flow rate of hydrogen in the anode off-gas.

In the air supply-discharge system 40, the air is compressed by an air compressor 44 and is supplied to cathodes of the fuel cell 200 via a piping 41. Cathode off-gas is released through a piping 42 to the atmosphere. An air flow meter 43 is provided upstream of the air compressor 44 on the piping 41 to measure the amount of the outside air taken in by the air compressor 44. The supply amount of the air by the air compressor 44 is controlled, based on the measurement value of the air flow meter 43. A pressure gauge (not shown) and a pressure regulator 46 are provided on the piping 42 to adjust the opening of the pressure regulator 46 based on the measured pressure value of the cathode off-gas by the pressure gauge.

The cooling system 50 mainly includes a piping 51, a cooling water pump 53 and a radiator 54. The cooling water is flowed through the piping 51 by the cooling water pump 53 to be circulated through the fuel cell 200 and thereby cool down the fuel cell 200, and is subsequently cooled down by the radiator 54 to be recirculated to the fuel cell 200.

The controller 60 is implemented by a microcomputer including a central processing unit and a main memory unit. When receiving a request for output power from an external load 84, the controller 60 controls the respective components of the fuel cell system 10 described above and a PCU (power control unit) 82 in response to the request to cause the fuel cell 200 to generate electric power. In addition to the above components, for example, a pressure gauge, a thermometer, an ammeter and a voltmeter may be provided in the fuel cell system 10.

Figure 2:
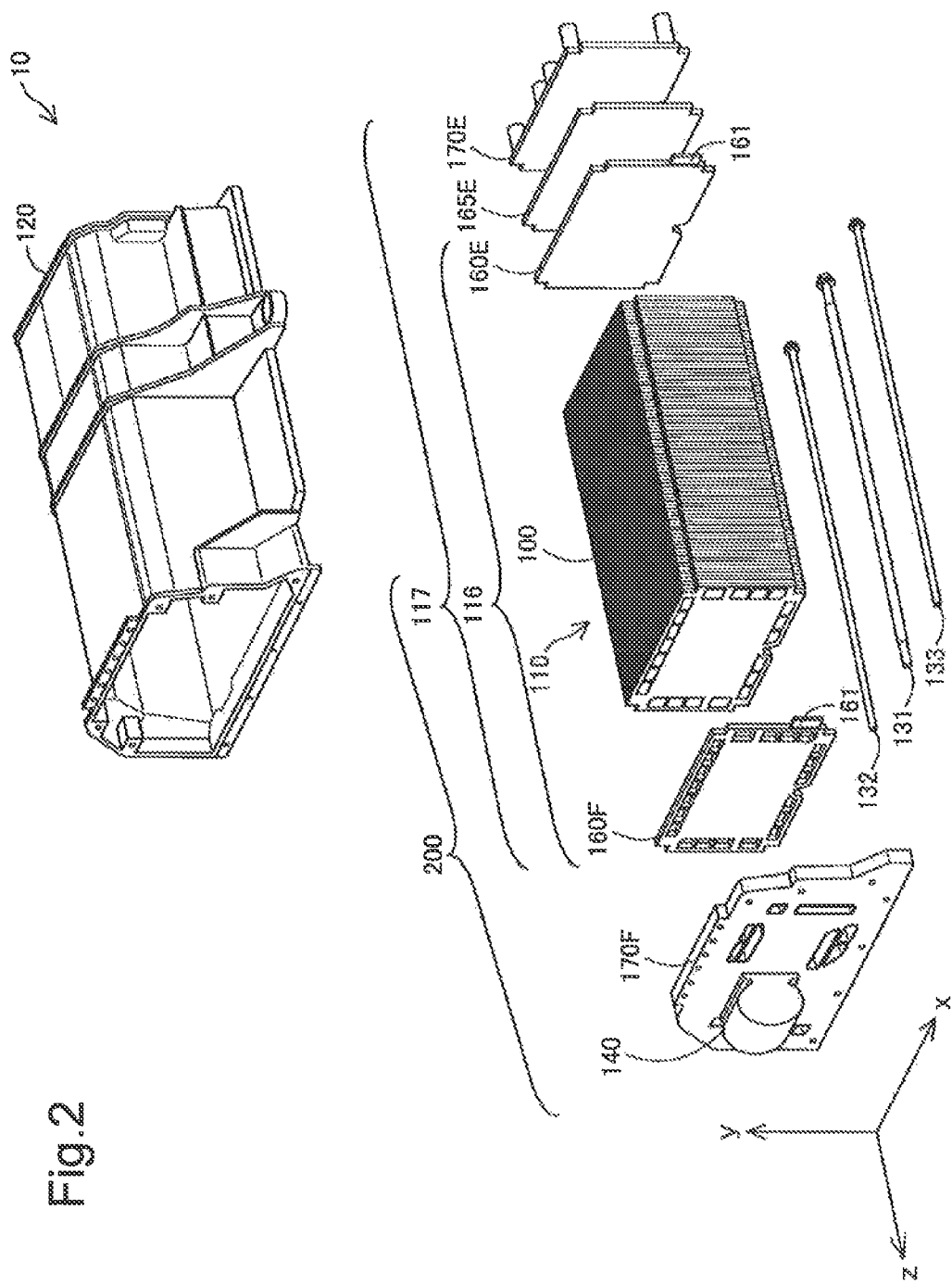
FIG. 2 is an exploded perspective view illustrating the schematic configuration of part of the fuel cell system.

FIG. 2 is an exploded perspective view illustrating the schematic configuration of part of the fuel cell system 10. As illustrated, the fuel cell system 10 of the embodiment includes the fuel cell 20, the hydrogen pump 140, three tension shafts 131, 132 and 133 (three tension shafts may be collectively expressed as tension shafts 130), and a fuel cell casing 120. In the description below, a positive z axis direction side in FIG. 2 is expressed as front side, a negative z axis direction side in FIG. 2 is expressed as rear side, a positive y axis direction side is expressed as upper side, and a negative y axis direction side is expressed as lower side.

The fuel cell 200 has stacked structure by stacking a current collector 160F and a front end-side end plate 170F in this sequence on the front side of a power generation body 110 that is comprised of a plurality of unit cells 100 stacked in the z axis direction (hereinafter also called "stacking direction") and by stacking a current collector 160E, an insulator plate 165E and a rear end-side end plate 170E in this sequence on the rear side of the power generation body 110. In the description below, a stacked body 116 denotes an assembly of the power generation body 110 with the current collector 160F stacked on the front side thereof and the current collector 160I stacked on the rear side thereof. A fuel cell main body 117 denotes an assembly of the stacked body 116 with the insulator plate 165E and the rear end-side end plate 170E stacked in this sequence on the rear side thereof. When there is no necessity to distinguish between the current collectors 160F and 160E, the current collectors 160F and 160E are collectively called current collector 160. The front end-side end plate 170F of this embodiment corresponds to the end plate in the claims.

The unit cell 100 has an anode-side separator (not shown), a cathode-side separator (not shown), and a seal member-integrated MEA (membrane electrode assembly) (not shown). The unit cell 100 has a fuel gas supply hole, an anode off-gas discharge hole, six oxidizing gas supply holes, seven cathode off-gas discharge holes, three cooling water supply holes and three cooling water discharge holes formed in its outer peripheral area. In the description below, these supply holes and discharge holes may be collectively referred to as "supply and discharge holes". These supply and discharge holes communicate with corresponding supply and discharge holes (described later) formed in the current collector 160F and the front end-side end plate 170F. In the fuel cell 200 configured by stacking a plurality of the unit cells 100, the supply and discharge holes respectively form manifolds for supplying hydrogen as the fuel gas, the air as the oxidizing gas and cooling water to the respective unit cells 100 and manifolds for discharging the anode off-gas, the cathode off-gas and the cooling water from the respective unit cells 100. Seal members (not shown) are provided around the outer peripheries of the respective supply and discharge holes to ensure the sealing properties of the manifolds between the separators in the stacked unit cells 100 and between the separator and the current collector 160.

The current collector 160F on the front end side and the current collector 160E on the rear end side serve to collect electric power generated by the respective unit cells 100 and output the collected electric power through respective current, collecting terminals 161 to the outside. The current collector 160F on the front end side has supply and discharge holes in its outer peripheral area similar to those in the respective unit cells 100. The current collector 160E on the rear end side, on the other hand, does not have such supply and discharge holes. The insulator plate 165E is an insulating resin plate, and the rear end-side end plate 170E is an aluminum metal plate. Like the current collector 160E on the rear end side, the insulator plate 165E and the rear end-side end plate 170E do not have supply and discharge holes corresponding to the supply and discharge holes formed in the respective unit cells 100 described above. This is attributed to the configuration of the fuel cell that reactive gases (hydrogen and the air) and cooling water are supplied from the front side-end plate 170F through the respective supply manifolds to the respective unit cells 100 and that off-gases and cooling water collected from the respective unit cells 100 go through the respective discharge manifolds and are discharged from the front end-side end plate 170F to the outside. The configuration of the fuel cell is, however, not limited to this configuration but may be any of various other configurations, for example, a configuration that the reactive gases and cooling water are supplied from the front end-side end plate 170F and that the off-gases and cooling water are discharged from the rear end-side end plate 170E to the outside.

As illustrated, the fuel cell casing 120 has an open front side and a rear side closed by a case end face (not shown). The fuel cell main body 117 is placed in the fuel cell casing 120, and the front end-side end plate 170F is placed to close the open front side of the fuel cell casing 120 and is fixed by means of bolts. In this state, the fuel cell 200 is configured in which the front end-side end plate 170F, the stacked boy 116, the insulator plate 165E and the rear end-side end plate 170E are stacked in this sequence.

The tension shafts 130 are located below (on the negative y axis direction side in FIG. 2) the fuel cell main body 117. The tension shafts 130 have their front ends connected with the front end-side end plate 170F and their rear ends connected with the case end face. The fuel cell casing 120 has an open bottom side that is closed by a case cover (not shown) in the state that the fuel cell main body 117 is placed in the fuel cell casing 120.

A through hole for pressing (not shown) is formed in the case end face on the rear side of the fuel cell casing 120. A pressing force in the stacking direction of the fuel cell 200 is applied by means of a press shaft (not shown) from outside of the fuel cell casing 120 via this through hole for pressing to the rear end-side end plate 170E. The rear end-side end plate 170 is fixed in the pressed state by a load adjustment screw (not shown), so that a compressive load in the stacking direction is applied to the fuel cell 200. The compressive load applied to the power generation body 110 is maintained by the front end-side end plate 170F and the tension shafts 130. More specifically, the front end-side end plate 170F and the tension shafts 130 serve to maintain the respective components of the fuel cell 200 stacked and keep the respective components in good contact with one another.

As described above, the hydrogen pump 140 regulates the circulation flow rate of hydrogen in the anode off-gas discharged from the fuel cell 200 and supplies the anode-off gas containing the regulated flow rate of hydrogen to the fuel cell 200. According to this embodiment, the hydrogen pump 140 is mounted to the front end-side end plate 170F.

A2. Configuration of Front End-Side End Plate

The front end-side end plate 170F includes an aluminum die-cast portion produced by high pressure casting of aluminum and a resin portion formed by coating the aluminum die-cast portion with an insulating resin. The front end-side end plate 170F has a pump surface which the hydrogen pump 140 is mounted to, and a contact surface that is on the back side of the pump surface and is in contact with the current collector 160F of the stacked body 116. The pump surface is a surface of the aluminum die-cast portion, and the contact surface is a surface of the resin portion. This embodiment employs polypropylene (PP) as the insulating resin. Placing the contact surface of the front end-side end plate 170F in contact with the current collector 160F causes the front end-side end plate 170F to be electrically insulated from the fuel cell main body 117. The die-cast material is not limited to aluminum but may be, for example, titanium, stainless steel, an alloy of titanium or stainless steel or an alloy of aluminum and titanium or stainless steel. The insulating resin is not limited to polypropylene (PP) but may be, for example, polyethylene (PE) or polystyrene (PS).

Figure 3:
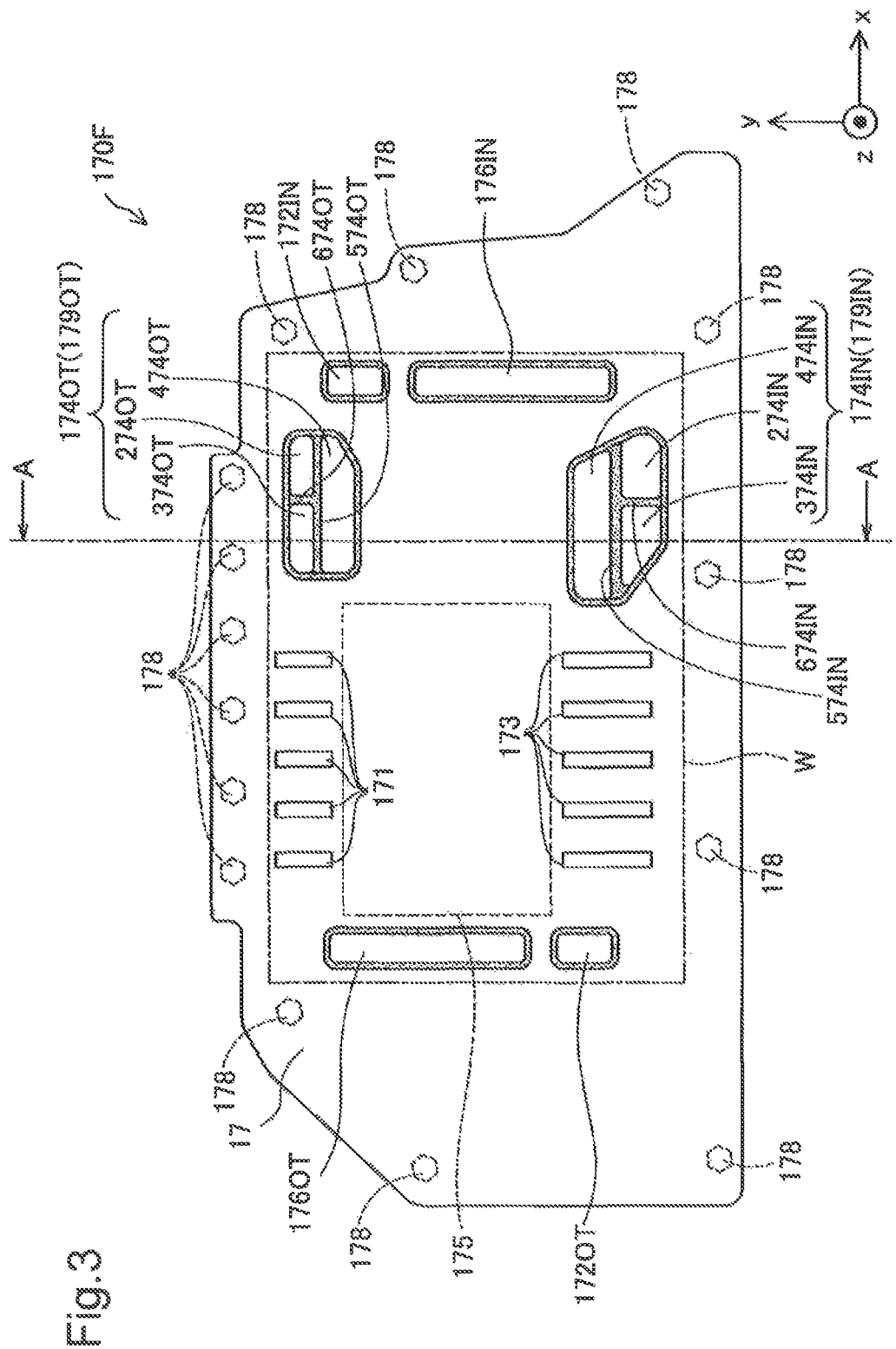
FIG. 3 is a plan view illustrating the schematic configuration of a front end-side end plate (pump surface) according to a first embodiment.

The following describes the pump surface of the front end-side end plate 170F with reference to FIG. 3. FIG. 3 is a plan view illustrating the schematic configuration of the front end-side end plate 170F (pump surface 17) according to the first embodiment. As described above, the front end-side end plate 170F is placed on the front end side of the stacked body 116. In FIG. 3, the position where the stacked body 116 is placed is shown as a location frame W by the one-dot chain line, for the purpose of indicating the positional relationship between the front end-side end plate 170F and the stacked body 116. An area where the hydrogen pump 140 is placed is shown as an area 175 by the broken line.

The front end-side end plate 170F has a substantially similar outer shape to the shape of the open front side of the fuel cell casing 120 (shown in FIG. 2). As shown in FIG. 3, the front end-side end plate 170F has a fuel gas supply port 172IN, an anode off-gas discharge port 172OT, an oxidizing gas supply port 174IN, a cathode off-gas discharge port 174OT, a cooling water supply port 176IN and a cooling water discharge port 176OT in the location frame W on the pump surface 17. The front end-side end plate 170F has a first plate portion 574IN and a second plate portion 674IN located in the oxidizing gas supply port 174IN. The first plate portion 574IN is arranged to divide the oxidizing gas supply port 174IN in the vertical direction (y axis direction), and the second plate portion 674IN is arranged to divide the oxidizing gas supply port 174IN in the x axis direction. The front end-side end plate 170F also has a third plate portion 574OT and a fourth plate portion 674OT located in the cathode off-gas discharge port 174OT. The third plate portion 574OT is arranged to divide the cathode off-gas discharge port 174OT in the vertical direction (y axis direction), and the fourth plate portion 674OT is arranged to divide the cathode off-gas discharge port 174OT in the x axis direction. The oxidizing gas supply port 174IN includes a first supply port 274IN, a second supply port 374IN and a third supply port 474IN that are parted by the first plate portion 574IN and the second plate portion 674IN. Similarly, the cathode off-gas discharge port 174OT includes a first discharge port 274OT, a second discharge port 374OT and a third discharge port 474OT that are parted by the third plate portion 574OT and the fourth plate portion 674OT. The front end-side end plate 170F additionally has ribs 171 and 173 provided on the upper side (positive y axis direction side) and on the lower side (negative y axis direction side) of the area 175. The ribs 171 and 173 work as radiation members to radiate the heat transmitted from the hydrogen pump 140 to the front end-side end plate 170F.

As described above, the pump surface 17 of the front end-side end plate 170F has the area 175 which the hydrogen pump 140 is mounted to, and the ribs 171 and 173 provided on the upper side and the lower side of the area 175. This configuration does not allow the oxidizing gas supply port 174IN to be formed in an elongated shape in the x axis direction (in other words, shape corresponding to the shape of the manifold formed to pass through the power generation body 110) along the lower side of the location frame W. Accordingly, the oxidizing gas supply port 174IN is configured to include the first supply port 274IN, the second supply port 374IN and the third supply port 474IN localized on the positive x axis direction side in FIG. 3. Similarly, the cathode off-gas discharge port 174OT is configured to include the first discharge port 274OT, the second discharge port 374OT and the third discharge port 474OT localized on the positive x axis direction side in FIG. 3.

The front end-side end plate 170F has through holes (not shown) formed near its outer periphery to receive bolts 178 inserted therein. The front end-side end plate 170F is placed to close the open front side of the fuel cell casing 120 and is fixed to the fuel cell casing 120 by means of the bolts 178 as described above. In FIG. 3, the bolts 178 are shown by the broken-line. In the fuel cell 200 of the embodiment, the front end-side end plate 170 is fastened to the fuel cell casing 120 by means of the bolts 178, so as to maintain the compressive load applied to the fuel cell 200.

Figure 4:
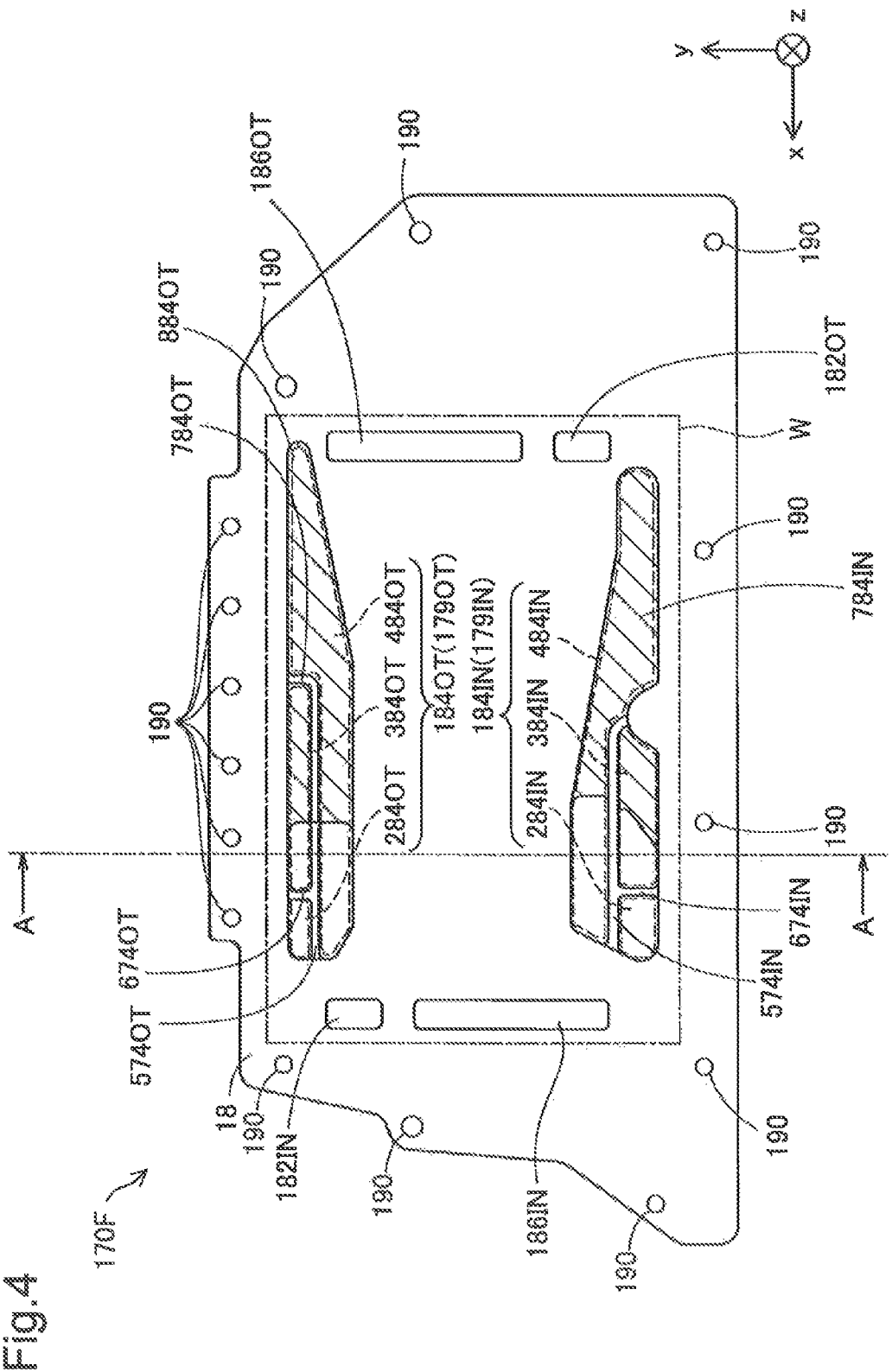
FIG. 4 is a plan view illustrating the schematic configuration of the front end-side end plate (contact surface)

The following describes the contact surface of the front end-side end plate 170F with reference to FIG. 4. FIG. 4 is a plan view illustrating the schematic configuration of the front end-side end plate 170F (contact surface 18). The position where the stacked body 116 is placed is also shown in FIG. 4 as the location frame W by the one-dot chain line, for the purpose of indicating the positional relationship between the front end-side end plate 170F and the stacked body 116.

As shown in FIG. 4, the front end-side end plate 170F has a fuel gas supply port 182IN, an anode off-gas discharge port 182OT, an oxidizing gas supply port 184IN, a cathode off-gas discharge port 184OT, a cooling water supply port 186IN and a cooling water discharge port 186OT in the location frame W on the contact surface 18. The front end-side end plate 170F has the first plate portion 574IN and the second plate portion 674IN located in the oxidizing gas supply port 184IN. The first plate portion 574IN is arranged to divide the oxidizing gas supply port 184IN in the vertical direction (y axis direction), and the second plate portion 674IN is arranged to divide the oxidizing gas supply port 184IN in the x axis direction. The front end-side end plate 170F also has the third plate portion 574OT, the fourth plate portion 674OT and a fifth plate portion 784OT located in the cathode off-gas discharge port 184OT. The third plate portion 574OT is arranged to divide the cathode off-gas discharge port 184OT in the vertical direction (y axis direction), and the fourth plate portion 674OT and the fifth plate portion 784OT are arranged to divide the cathode off-gas discharge port 184OT in the x axis direction. The oxidizing gas supply port 184IN includes a first supply port 284IN, a second supply port 384IN and a third supply port 4841N that are parted by the first plate portion 574IN and the second plate portion 674IN. Similarly, the cathode off-gas discharge port 184OT includes a first discharge port 284OT, a second discharge port. 384OT and a third discharge port 484OT that are parted by the third plate portion 574OT, the fourth plate portion 674OT and the fifth plate portion 784OT. In FIG. 4, the first supply port 284IN, the second supply port 384IN, the third supply port 484IN, the first discharge port 284OT, the second discharge port 384OT and the third discharge port 484OT are shown by the broken line. For the purpose of clearly indicating these first to the third supply and discharge ports, the broken lines representing these supply and discharge ports are slightly shifted inward from the solid lines representing the oxidizing gas supply port 184IN and the cathode off-gas discharge port 184OT.

Figure 5:
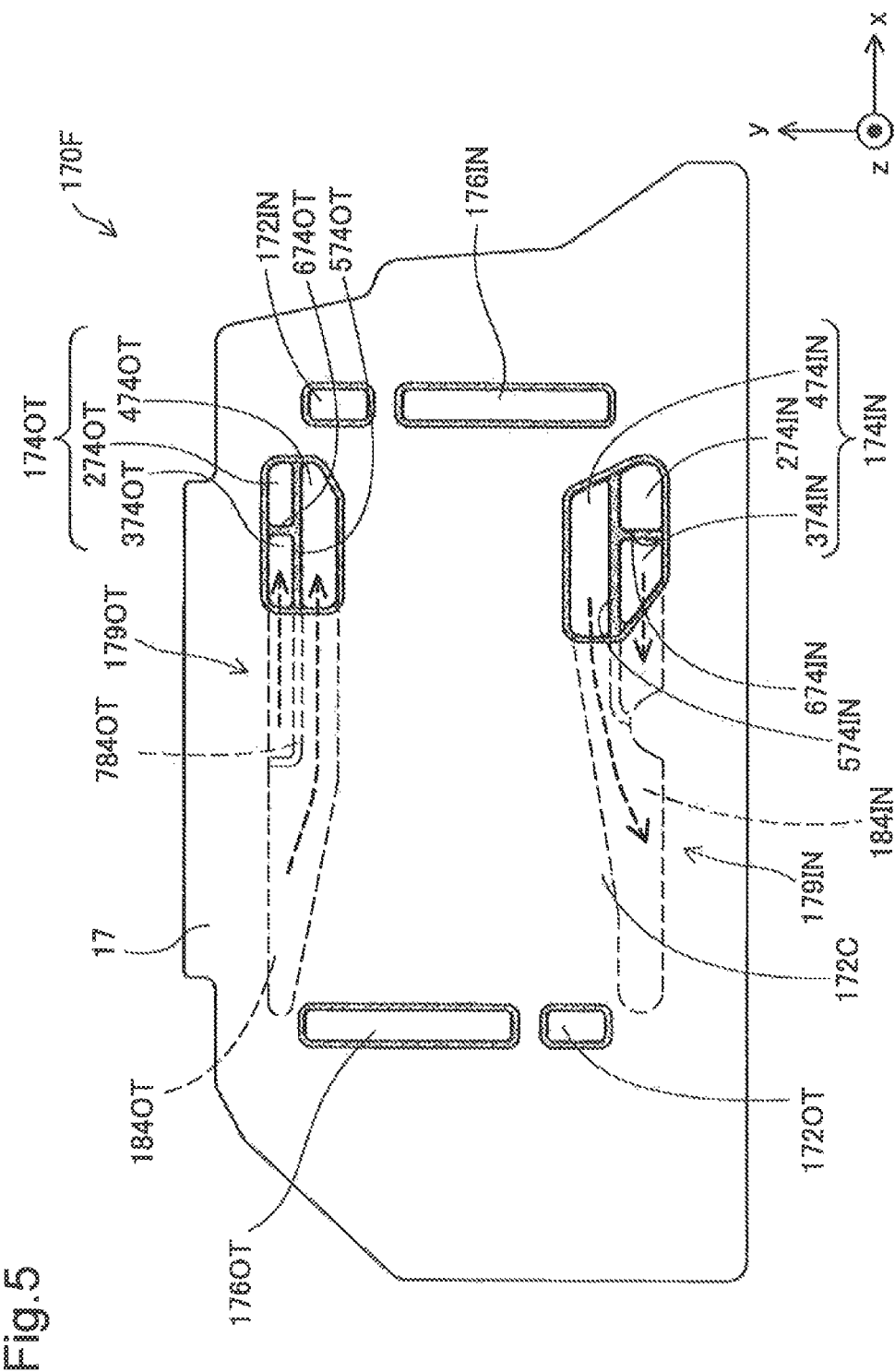
FIG. 5 is a diagram illustrating the positional relationship between supply and discharge ports on the pump surface and corresponding supply and discharge ports on the contact surface.

The following describes the supply and discharge holes provided in the front end-side end plate 170F with reference to FIGS. 3 to 5. FIG. 5 is a diagram illustrating the positional relationship between the supply and discharge ports on the pump surface 17 and the corresponding supply and discharge ports on the contact surface 18. FIG. 5 is a plane view from the pump surface 17-side and shows the respective supply and discharge ports on the contact surface 18-side by the broken line. As illustrated, the fuel gas supply port 182IN, the anode off-gas discharge port 182OT, the cooling water supply port 186IN and the cooling water discharge port 186OT on the contact surface 18-side are respectively formed at corresponding positions in substantially similar shapes to those of the fuel gas supply port 172IN, the anode off-gas discharge port 172OT, the cooling water supply port 176IN and the cooling water discharge port 176OT on the pump surface 17-side, so as to form through holes that pass through the front end-side end plate 170F parallel to the z axis. As shown in FIG. 5, on the other hand, the oxidizing gas supply port 184IN on the contact surface 18-side is larger in size than the oxidizing gas supply port 174IN on the pump surface 17-side. The oxidizing gas supply port 184IN and the oxidizing gas supply port 174IN are connected to form an oxidizing gas supply hole 179IN that passes through the front end-side end plate 170F from the contact surface 18-side to the pump surface 17-side. The first plate portion 574IN is located inside the oxidizing gas supply hole 179IN. A non-overlapped portion in the oxidizing gas supply port 184IN that is not overlapped with the oxidizing gas supply port 174IN (hatched portion in FIG. 4) forms a channel portion 784IN. Similarly, the cathode off-gas discharge port 184OT on the contact surface 18-side is larger in size than the cathode off-gas discharge port 174ON on the pump surface 17-side. The cathode off-gas discharge port 184OT and the cathode off-gas discharge port 174OT are connected to form a cathode off-gas discharge hole 179OT that passes through the front end-side end plate 170F from the contact surface 18-side to the pump surface 17-side. The third plate portion 574OT is located inside the cathode off-gas discharge hole 179OT. A non-overlapped portion in the cathode off-gas discharge port 184OT that is not overlapped with the cathode off-gas discharge port 174OT (hatched portion in FIG. 4) forms a channel portion 884OT. The oxidizing gas supply hole 179IN and the cathode off-gas discharge hole 179OT of the embodiment respectively correspond to the through holes in the claims.

The air supplied through the piping 41 (shown in FIG. 1) to the fuel cell 200 flows in via the oxidizing gas supply port 174IN, is rectified and distributed by the first plate portion 574IN and the second plate portion 674IN, and flows through the channel portion 784IN (as shown by the broken-line arrow in FIG. 5). The cathode off-gas discharged from the stacked body 116 flows through the channel portion 884OT via the cathode off-gas discharge port 184OT, is rectified and joined by the fifth plate portion 784OT and is discharged via the cathode off-gas discharge port 174OT to the piping 42 (shown in FIG. 1) (as shown by the broken-line arrow in FIG. 5).

Figure 6:
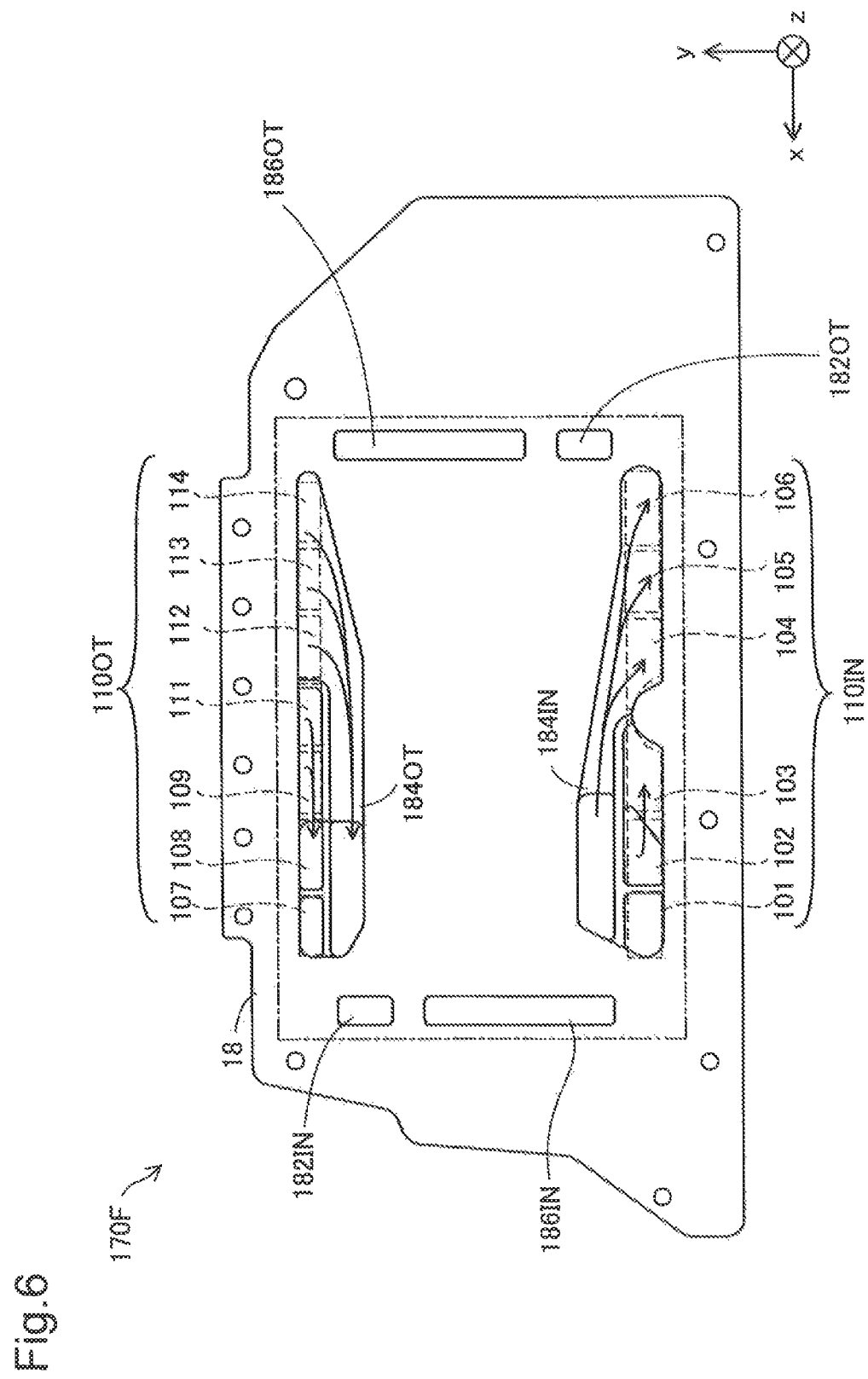
FIG. 6 is a diagram illustrating the positional relationship between the supply and discharge ports on the contact surface of the front end-side end plate and manifolds in a stacked body.

FIG. 6 is a diagram illustrating the positional relationship between the supply and discharge ports on the contact surface 18 of the front end-side end plate 170F and manifolds in the stacked body 116. The respective manifolds are arranged to pass through the power generation body 110 and the current collector 160F parallel to the z axis. Manifold openings (open ends of the manifolds) formed in an end face of the stacked body 116 (i.e., surface of the current collector 160F that is in contact with the front end-side end plate 170F) have shapes corresponding to planar shapes of the manifolds in an xy plane. In FIG. 6, the manifold openings are shown by the broken line to indicate the locations of the manifolds. The fuel gas supply port 182IN, the anode off-gas discharge port 182OT, the cooling water supply port 186IN and the cooling water discharge port 186OT are formed at the corresponding locations to those of the respective corresponding manifolds formed in the stacked body 116, so that the manifold openings corresponding to these manifolds are omitted from the illustration of FIG. 6. FIG. 6 shows oxidizing gas supply manifold openings 110IN of an oxidizing gas supply manifold 111IN (shown in FIG. 7 and described later) and cathode off-gas discharge manifold openings 110OT of a cathode off-gas discharge manifold 111OT (shown in FIG. 7 and described later). The location of the stacked body 116 is shown by the one-dot chain line like FIGS. 3 and 4. The oxidizing gas supply manifold openings 110IN and the cathode off-gas discharge manifold openings 110OT of this embodiment correspond to the opening of the manifold in the claims.

The oxidizing gas supply manifold 111IN formed in the stacked body 116 (shown in FIG. 7) is divided into a plurality of parts by partition walls. The oxidizing gas supply manifold openings 110IN include a first manifold opening 101, a second manifold opening 102, a third manifold opening 103, a fourth manifold opening 104, a fifth manifold opening 105 and a sixth manifold opening 106. The flow of the air from the respective supply ports of the oxidizing gas supply port 174IN on the pump surface 17-side of the front end-side end plate 170F to the respective manifold openings 101 to 106 of the stacked body 116 is described with reference to FIGS. 3, 4 and 6. The first manifold opening 101 is located at a substantially corresponding position and has a substantially similar shape to those of the first supply port 274IN of the oxidizing gas supply port 174IN on the pump surface 17-side and the first supply port 284IN of the oxidizing gas supply port 184IN on the contact surface 18-side. Accordingly, the air supplied via the first supply port 274IN is supplied to the first manifold opening 101 via the first supply port 284IN. The second manifold opening 102 is located at a substantially corresponding position and has a substantially similar shape to that of the second supply port 374IN of the oxidizing gas supply port 171IN. The combination of the second manifold opening 102 and the third manifold opening 103 is located at a substantially corresponding position and has a substantially similar shape to the second supply port 384IN of the oxidizing gas supply port 184 IN. Accordingly, the air supplied via the second supply port 374IN (shown in FIG. 3) is distributed and supplied to the second manifold opening 102 and the third manifold opening 103 via the second supply port 384IN (shown in FIG. 4). The air supplied from the third supply port 474IN (shown in FIG. 3) flows through the channel portion 784IN (shown in FIG. 4) and is distributed and supplied to the fourth manifold opening 104, the fifth manifold opening 105 and the sixth manifold opening 106 via the third supply port 484IN (shown in FIG. 4). As described above, the air supplied to the front end-side end plate 170F is rectified and distributed to the first to the sixth manifold openings 101 to 106 by the first plate portion 574IN and the second plate portion 674IN.

The cathode off-gas discharge manifold 111OT formed in the stacked body 116 is divided into a plurality of parts by partition walls. The cathode off-gas discharge manifold openings 110OOT include a seventh manifold opening 107, an eighth manifold opening 108, a ninth manifold opening 109, an eleventh manifold opening 111, a twelfth manifold opening 112, a thirteenth manifold opening 113 and a fourteenth manifold opening 114. The flow of the cathode off-gas from the respective manifold openings 107 to 109 and 111 to 114 of the stacked body 116 to the respective discharge ports of the cathode off-gas discharge port 174OT on the pump surface 17-side of the front end-side end plate 170F is described with reference to FIGS. 3, 4 and 6. The seventh manifold opening 107 is located at a substantially corresponding position and has a substantially similar shape to those of the first discharge port 274OT of the cathode off-gas discharge port 174OT on the pump surface 17-side (shown in FIG. 3) and the first discharge port 284OT of the cathode off-gas discharge port 184OT on the contact surface 18-side (shown in FIG. 4). Accordingly, the cathode off-gas discharged from the seventh manifold opening 107 is discharged through the first discharge port 284OT and then the first discharge port 274OT to the piping 42 (shown in FIG. 1). The eighth manifold opening 108 is located at a substantially corresponding position and has a substantially similar shape to that of the second discharge port 374OT of the cathode off-gas discharge port 174OT (shown in FIG. 3). The combination of the eighth manifold opening 108, the ninth manifold opening 109 and the eleventh manifold opening 111 is located at a substantially corresponding position and has a substantially similar shape to the second discharge port 384OT of the cathode off-gas discharge port 184OT (shown in FIG. 4). Accordingly, the cathode off-gas discharged from the eighth manifold opening 108, the ninth manifold opening 109 and the eleventh manifold opening 111 is joined via the second discharge port 384OT (shown in FIG. 4) and is discharged through the second discharge port 374OT (shown in FIG. 3) to the piping 42 (shown in FIG. 1). The cathode off-gas discharged from the twelfth manifold opening 112, the thirteenth manifold opening 113 and the fourteenth manifold opening 114 is joined and flows into the channel portion 884OT (shown in FIG. 4) and is discharged through the third discharge port 474OT (shown in FIG. 3) to the piping 42 (shown in FIG. 1). As described above, the cathode off-gas discharged from the seventh to the ninth manifold openings 107 to 109 and the eleventh to the fourteenth manifold openings 111 to 114 is rectified and joined by the third plate portion 574OT and the fifth plate portion 784OT of the front end-side end plate 170F and is discharged to the piping 42.

Figure 7:
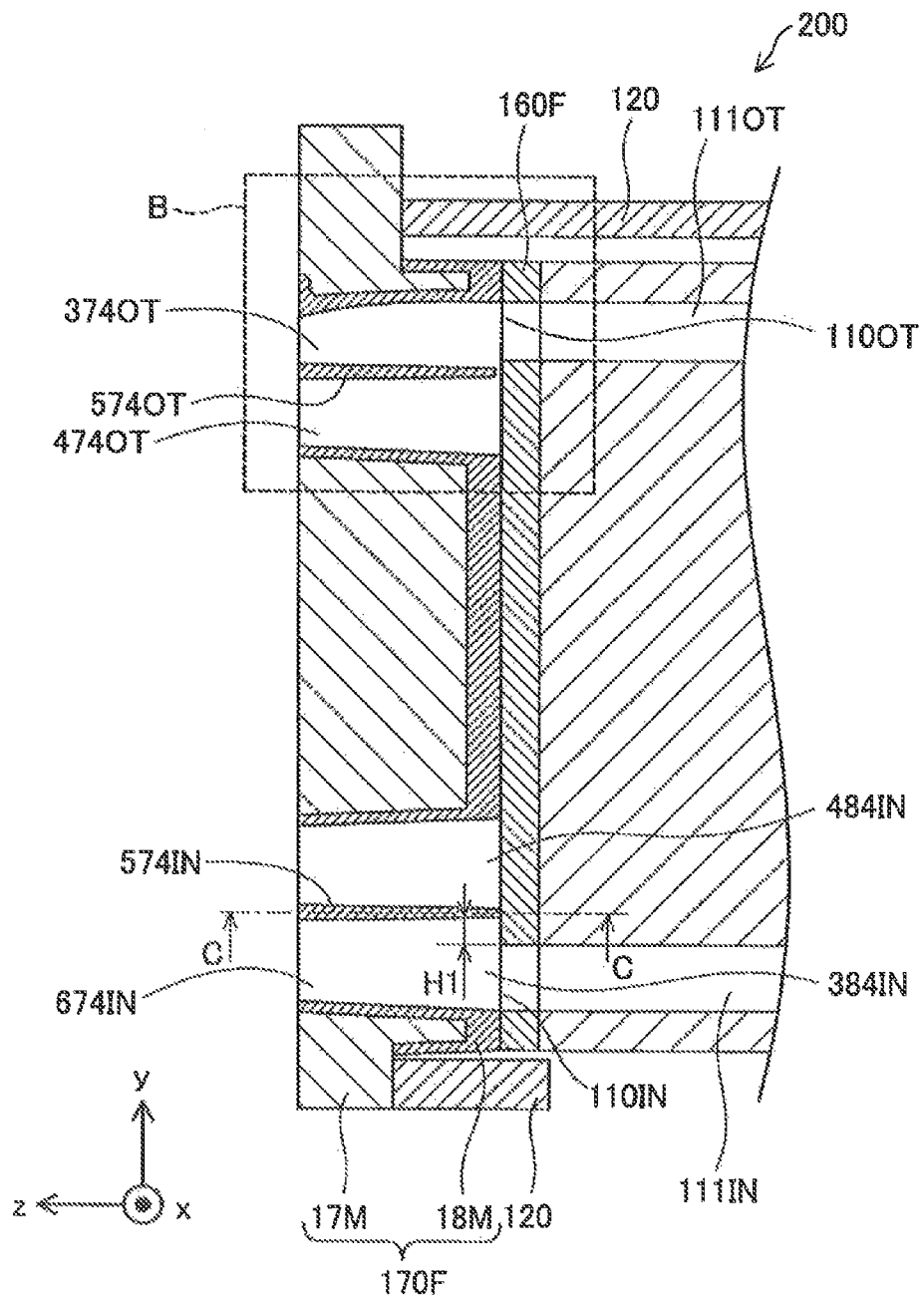
FIG. 7 is a partial sectional view schematically illustrating an A-A sectional surface of the fuel cell in FIGS. 3 and 4.
Figure 8:
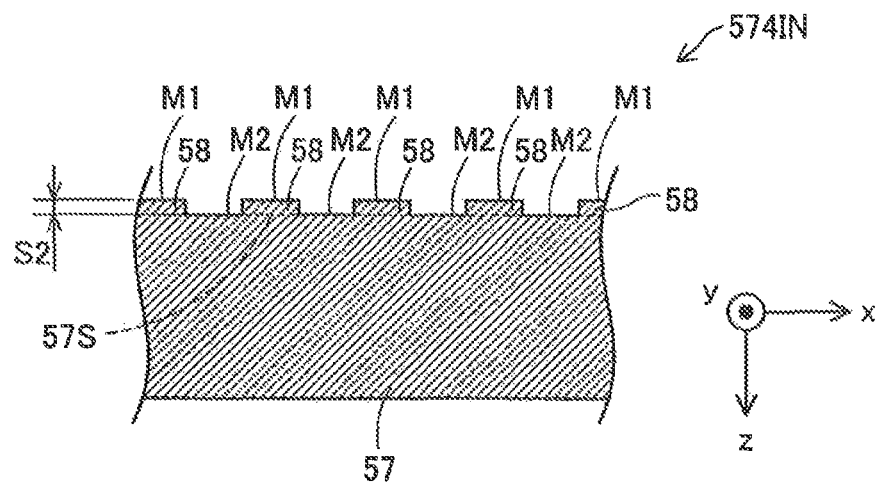
FIG. 8 is a partial sectional view schematically illustrating a C-C sectional surface of the fuel cell in FIG. 7.

The following describes the configuration of the first plate portion 574IN with reference to FIGS. 7 and 8. FIG. 7 is a partial sectional view schematically illustrating an A-A sectional surface of the fuel cell 200 in FIGS. 3 and 4. FIG. 8 is a partial sectional view schematically illustrating a C-C sectional surface of the fuel cell 200 in FIG. 7. As shown in FIG. 7, the first plate portion 574IN is arranged substantially perpendicular to the current collector 160F to be in contact with the current collector 160F. The first plate portion 574IN is arranged at a position corresponding to the outer circumference of the second manifold opening 102 to be shifted upward (in the positive y axis direction) by a distance H1 from the outer periphery of the second manifold opening 102. As shown in FIG. 8, the first plate portion 574IN includes a sixth plate portion 57 and a plurality of contact portions 58 provided on a side face of the sixth plate portion 57. The sixth plate portion 57 is formed integrally with the plurality of contact portions 58 and has no distinct border. For convenience of explanation, however, the end of the sixth plate portion 57 is indicated by the broken line. The plurality of contact portions 58 are arranged at equal intervals. This provides a side face of the first plate portion 574IN that is in contact with the current collector 160F with a regular concave-convex shape. The first plate portion 574IN is in contact with the current collector 160F at first side faces M1, while being arranged away from the current collector 160F at second side faces M2. In other words, the sixth plate portion 57 is arranged away from the current collector 160F. The sixth plate portion 57 of this embodiment corresponds to the plate portion in the claims, and the first side face M1 corresponds to the contact side face in the claims. The sixth plate portion 57 also corresponds to the cathode gas plate portion in the claims.

As described above, the plurality of contact portions 58 are arranged at equal intervals in the first plate portion 574IN. This configuration causes the current collector 160F to be pressed with a uniform surface pressure by the side face of the first plate portion 574IN. The first side face M1 of the contact portion 58 has a length (length in the x axis direction) that is shorter than the length (overall length in the x axis direction) of a plate portion side face 57S of the sixth plate portion 57. This configuration allows for molding with the higher accuracy and facilitates management in manufacture, compared with a configuration of the first plate portion 574In without the contact portions 58. The length in the x axis direction of the first side face M1 of this embodiment corresponds to the length of the contact side face in the claims. The length (overall length) in the x axis direction of the plate portion side face 57S of the sixth plate portion 57 of this embodiment corresponds to the length of the side face of the plate portion in the claims.

Figure 9:
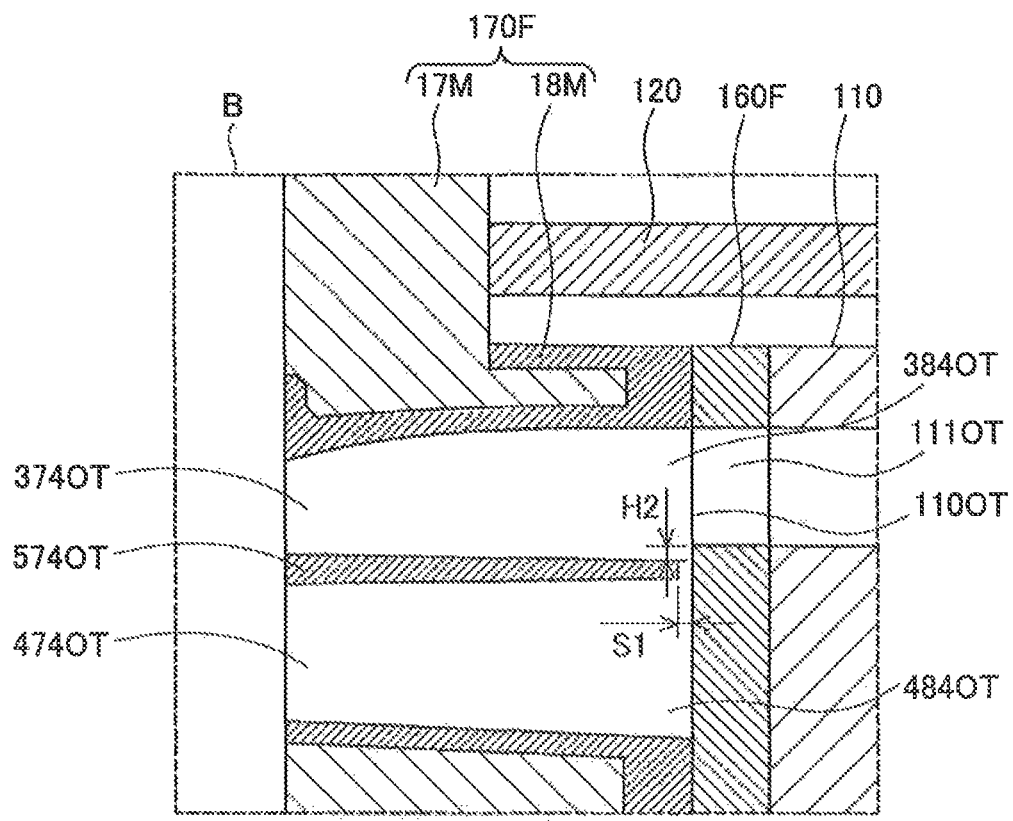
FIG. 9 is an enlarged view illustrating a part B in FIG. 7.

The following describes the configuration of the third plate portion 574OT with reference to FIGS. 7 and 9. FIG. 9 is an enlarged view illustrating a part B in FIG. 7. As described above, the front end-side end plate 170F includes an aluminum die-cast portion 17M and a resin portion 18M (shown in FIG. 7). As shown in FIG. 7, the third plate portion 574OT is made of only a resin. The third plate portion OT is a flat plate having an approximately rectangular planar shape (viewed from the y axis direction) and has a smooth side face on the current collector 160F-side, unlike the first plate portion 574IN. The third plate portion 574OT is made of only a resin as mentioned above and has a draft angle for the purpose of facilitating manufacture.

As shown in FIGS. 7 and 9, the third plate portion 574OT is arranged substantially perpendicular to the current collector 160F at a position corresponding to the lower side (negative y axis direction side) in the gravity direction of the outer circumference of the cathode off-gas discharge manifold opening 110OT. The third plate portion 574OT is also arranged such that the upper surface (surface on the positive y axis direction side) of the third plate portion 574OT is approximately aligned (or misaligned by only a very small distance H2) with the outer periphery (lower edge) of the cathode off-gas discharge manifold opening 110OT. As shown in FIG. 9, the third plate portion 574OT is arranged away from the current collector 160F across a clearance S1. Even when the third plate portion 574OT is located very close to the cathode off-gas discharge manifold opening 110OT, this configuration reduces the likelihood that the third plate portion 574OT enters the cathode off-gas discharge manifold 111OT by the compressive load in the stacking direction. The third plate portion 574OT of this embodiment corresponds to the plate portion and the cathode off-gas plate portion in the claims.

A3. Advantageous Effects of Embodiment

In the fuel cell 200 of this embodiment, the first plate portion 574IN of the front end-side end plate 170F has the plurality of contact portions 58 arranged at equal intervals. This configuration causes the current collector 160F to be pressed with a uniform surface pressure by the side face of the first plate portion 574IN. The first side face M1 of the contact portion 58 has the length (length in the x axis direction) that is shorter than the length (overall length in the x axis direction) of the plate portion side face 57S of the sixth plate portion 57. This configuration allows for molding with the higher accuracy and facilitates management in manufacture, compared with the configuration without the first side faces M1. The surface that requires the high accuracy is limited to the first side faces M1. This enhances the accuracy of a mold.

In the fuel cell 200 of this embodiment, the third plate portion 574OT of the front end-side end plate 170F is arranged away from the current collector 160F across the clearance S1. Even when the third plate portion 574OT is pressed in the negative z axis direction by the compressive load applied in the stacking direction of the fuel cell 200, this configuration reduces the likelihood that the third plate portion 574OT enters the cathode off-gas discharge manifold 111OT. Accordingly this suppresses interference with the flow of the cathode off-gas from the cathode off-gas discharge manifold 111OT to the cathode off-gas discharge port 174OT.

In the fuel cell 200 of this embodiment, the third plate portion 574OT of the front end-side end plate 170F is arranged away from the current collector 160F across the clearance S1 at the position corresponding to the lower side (negative y axis direction side) in the gravity direction of the outer circumference of the cathode off-gas discharge manifold opening 110OT. In the course of discharging the cathode off-gas from the stacked body 116, this configuration causes liquid water in the cathode off-gas to drop down toward the third discharge port 484OT via the clearance S1. This configuration suppresses the back flow of liquid water into the cathode off-gas discharge manifold 111OT by the draft angle of the third plate portion 574OT. In the case where the fuel cell 200 is mounted on a vehicle and is inclined during a run of the vehicle, this configuration similarly suppresses the back flow of liquid water into the cathode off-gas discharge manifold 111OT.

In the configuration of this embodiment, with regard to the first plate portion 574IN located inside of the oxidizing gas supply port 184IN of the front end-side end plate 170F and the third plate portion 574OT located in the cathode off-gas discharge port 184OT, the third plate portion 574OT having the shorter distance from the outer periphery of the manifold in the stacked body 116 (H2 (shown in FIG. 9)<H1 (shown in FIG. 7)) is arranged away from the current collector 160F. This is because the first plate portion 54In is arranged away from the outer periphery of the manifold in the stacked body 116 by the distance H1 and is unlikely to enter the second manifold opening 102 by the compressive load applied in the stacking direction. The third plate portion 574OT is arranged away from the current collector 160F across the clearance S1, in order to suppress interference with discharge of the cathode off-gas. The first plate portion 574IN is arranged, on the other hand, to be in contact with the current collector 160F, in order to maintain the surface pressure applied to the current collector 160F.

In the fuel cell 200 of this embodiment, the oxidizing gas supply port 174IN and the cathode off-gas discharge port 174OT are localized on the pump surface 17 of the front end-side end plate 170F. This provides a space for mounting the hydrogen pump 140 to the pump surface 17.

The front end-side end plate 170F is configured, such that the oxidizing gas supply port 174IN is localized on the pump surface 17 while the oxidizing gas supply port 184IN is formed on the contact surface 18 to include the oxidizing gas supply manifold openings 110IN. This causes the oxidizing gas supply hole 179IN of the front end-side end plate 170F to adequately communicate with the oxidizing gas supply manifold 111IN formed in the stacked body 116. Additionally, the front end-side end plate 170F includes the first plate portion 574IN and the second plate portion 674IN. The air supplied from the piping 41 (shown in FIG. 1) is subjected to adequate flow rate regulation and rectification by the first plate portion 574IN and the second plate portion 674IN and is distributed to the oxidizing gas supply manifold openings 110IN. Similarly, the front end-side end plate 170F is configured, such that the cathode off-gas discharge port 174OT is localized on the pump surface 17 while the cathode off-gas discharge port 184OT is formed on the contact surface 18 to include the cathode off-gas discharge manifold openings 110OT. This causes the cathode off-gas discharge hole 179OT of the front end-side end plate 170F to adequately communicate with the cathode off-gas discharge manifold 111OT formed in the stacked body 116. Additionally, the front end-side end plate 170F includes the third plate portion 574OT, the fourth plate portion 674OT and the fifth plate portion 784OT. The cathode off-gas discharged from the cathode off-gas discharged manifold openings 110OT is thus joined, is subjected to adequate flow rate regulation and is discharged via the cathode off-gas discharge port 174OT to the piping 42 (shown in FIG. 1).

B. Second Embodiment

Figure 10:
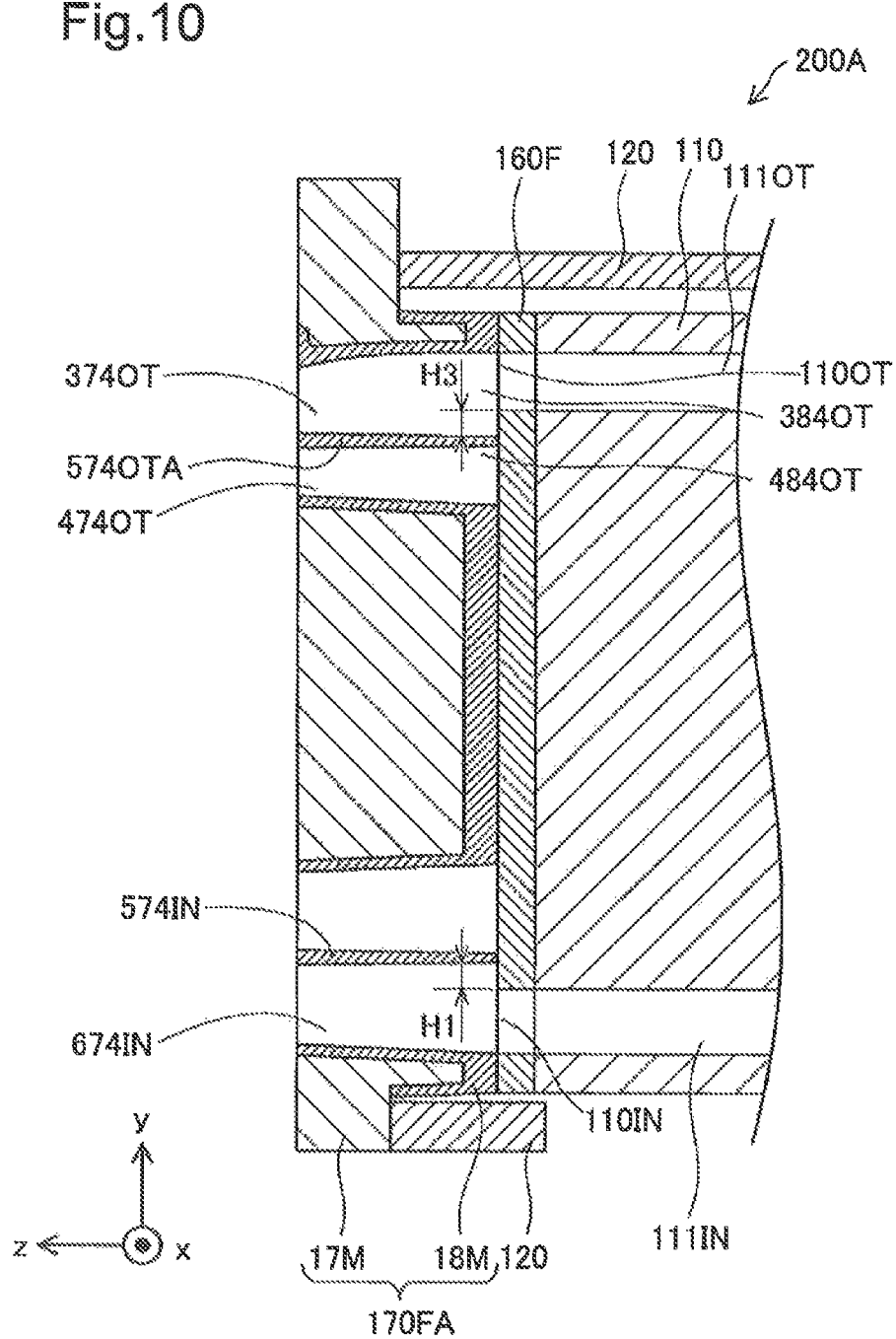
FIG. 10 is a partial sectional view schematically illustrating part of a fuel cell according to a second embodiment.

FIG. 10 is a partial sectional view schematically illustrating part of a fuel cell 200A according to a second embodiment. In the fuel cell 200A of the second embodiment, a third plate portion 574OTA of a front end-side end plate 170FA located inside of the cathode off-gas discharge hole 179OT differs from the third plate portion 574OT of the first embodiment. A fuel cell system of the second embodiment otherwise has similar components to those of the fuel cell system 10 of the first embodiment. The like components are expressed by the like symbols and are not specifically described here. The following describes the third plate portion 574OTA.

As shown in FIG. 10, the third plate portion 574OTA of the second embodiment is arranged substantially perpendicular to the current collector 160F to be in contact with the current collector 160F. The third plate portion 574OTA is arranged at a position corresponding to the outer circumference of the cathode off-gas discharge manifold opening 110OT to be shifted downward (in the negative y axis direction) from the outer periphery of the cathode off-gas discharge manifold opening 110OT by a distance H3 (H3=H1). According to this embodiment, the third plate portion 574OTA has a similar shape to that of the first plate portion 574IN. More specifically, a side face of the third plate portion 574OTA that is in contact with the current collector 160F is formed to have a regular concave-convex shape. In the fuel cell 200A of this embodiment, this configuration causes the current collector 160F to be pressed with a uniform surface pressure by the side faces of the first plate portion 574IN and the third plate portion 574OTA. The side face of the third plate portion 574OTA formed in the concave-convex shape partially provides a clearance between the third plate portion 574OTA and the current collector 160F. This configuration causes liquid water in the cathode off-gas to drop down toward the third discharge port 484OT via the clearance. This configuration accordingly suppresses the back flow of liquid water into the cathode off-gas discharge manifold 111OT. In this embodiment, the third plate portion 574OTA is provided at the position shifted from the outer periphery of the cathode off-gas discharge manifold opening 110OT by the distance H3. Even when the third plate portion 574OTA is pressed in the negative z axis direction by the compressive load, this configuration reduces the likelihood that the third plate portion 574OTA enters the cathode off-gas discharge manifold 111OT. In the fuel cell 200A of the second embodiment, the third plate portion 574OTA presses the current collector 160F with a uniform surface pressure, while suppressing the back flow of liquid water in the cathode off-gas into the cathode off-gas discharge manifold 111OT.

C. Modifications

The invention is not limited to any of the embodiments described above but may be implemented by a diversity of other aspects and configurations without departing from the scope of the invention. For example, the technical features of any of the embodiments corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein. Some examples of possible modification are given below.

(1) In the first embodiment described above, the first plate portion 574IN may be configured without the contact portions 58. In other words, both the first plate portion 574IN and the third plate portion 574OT may be arranged away from the current collector 160F across clearances. Even when the first plate portion 574IN is located very close to the outer periphery of the oxidizing gas supply manifold opening 110IN, this configuration reduces the likelihood that the first plate portion 574IN enters the oxidizing gas supply manifold 111IN by the compressive load applied to the fuel cell 200 and suppresses interference with the flow of the air.

(2) In the above embodiment, the first plate portion 574IN is arranged at the position corresponding to the upper side in the gravity direction of the outer circumference of the oxidizing gas supply manifold opening 110IN. The first plate portion 574IN may alternatively be arranged at a position corresponding to the lower side in the gravity direction of the oxidizing gas supply manifold opening 110IN. For example, in a configuration of supplying the humidified air as the oxidizing gas, supplying the humidified air including liquid water to the unit cell makes the liquid water likely to block an oxidizing gas flow path in the unit cell. Providing the first plate portion 574IN at the position corresponding to the lower side in the gravity direction of the oxidizing gas supply manifold opening 110IN allows liquid water in the air to drop down via a clearance formed between the first plate portion 574IN and the current collector 160F. This suppresses the oxidizing gas flow path in the unit cell from being blocked.

(3) In the above embodiment, the first plate portion 574IN and the third plate portion 574OT are respectively provided in the oxidizing gas supply port and the cathode off-gas discharge port. This configuration is, however, not restrictive. For example, similar plate portions may be provided in the fuel gas supply port and the anode off-gas supply port. This modified configuration suppresses interference with the flows of the fuel gas and the anode off-gas, while suppressing liquid water included in the fuel gas or the anode off-gas from flowing into a manifold and thereby suppressing a fuel gas flow path in the unit cell from being blocked. For example, the anode off-gas is likely to include back diffusion water, which is produced at the cathode and is migrated to the anode across the electrolyte membrane, as liquid water. In a configuration of recirculating the anode off-gas, there is a possibility that the back diffusion water is included as liquid water in the fuel gas.

(4) The front end-side end plate 170F includes the aluminum die-cast portion having one surface coated with the insulating resin. This configuration is, however, not restrictive. For example, the aluminum die-cast portion may not be coated with the insulating resin. In other words, the front end-side end plate 170F may not include the resin portion 18M. In the configuration without the resin portion 18M, however, it is preferable to provide an insulator plate between the front end-side end plate 170F and the current collector 160F. In this configuration, the contact surface of the front end-side end plate 170F is in contact with the insulator plate.

(5) In the above embodiment, the third plate portion 574OT is arranged at the position corresponding to the lower side in the gravity direction of the cathode off-gas discharge manifold opening 110OT. This configuration is, however, not restrictive. The third plate portion 574OT may be arranged at a position corresponding to the upper side in the gravity direction or on the lateral side of the cathode off-gas discharge manifold opening 110OT. For example, in the case where the third plate portion 574OT is arranged at the position corresponding to the upper side in the gravity direction of the cathode off-gas discharge manifold opening 111OT, liquid water in the cathode off-gas may be sucked through a clearance formed between the third plate portion 574OT and the current collector 160F and discharged through the first discharge port 284OT to the piping 42. It is, however, preferable to arrange the third plate portion 574OT at the position corresponding to the lower side in the gravity direction of the cathode off-gas discharge manifold opening 110OT, since this configuration allows liquid water to be dropped down and discharged by the gravitational force.

(6) In the above embodiment, the reactive gases are supplied to the stacked body 116 and the off-gases are discharged from the stacked body 116 via the front end-side end plate 170F. This configuration is, however, not restrictive. In one modification, for example, the reactive gases may be supplied from the front end-side end plate 170F, while the off-gases may be discharged via the rear end-side end plate 170E to the outside. In this modified configuration, a plate portion may be provided in an off-gas discharge port of an off-gas discharge hole in the rear end-side end plate 170E, on a contact surface of the rear end-side end plate 170E that is in contact with the insulator plate 165E. The plate portion may be arranged away from the insulator plate 165E across a clearance. The rear end-side end plate 170E of this modification also corresponds to the end plate in the claims.

(7) In the above embodiment, the first plate portion 574IN and the third plate portion 574OT are arranged substantially perpendicular to the current collector 160F. This configuration is, however, not restrictive. For example, the first plate portion 574IN and the third plate portion 574OT may be arranged at an angle of, for example, 45 degrees or 60 degrees relative to the current collector 160F. The first plate portion 574IN and the third plate portion 574OT should be arranged in the oxidizing gas supply hole 179IN and the cathode off-gas discharge hole 179OT, such that the respective plate surfaces are not opposed to the current collector 160F but their side faces are opposed to the current collector 160F.

(8) In the above embodiment, the first plate portion 574IN has the plurality of contact portions 58. The first plate portion 574IN should be configured to have at least one contact portion 58. Providing even one contact portion 58 allows the stacked body 116 to be pressed by the contact portion 58 and thereby suppresses a decrease in surface pressure of the unit cell 100, compared with a configuration without any contact portion 58.

(9) In the above embodiment, the plurality of contact portions 58 of the first plate portion 574IN are arranged at equal intervals. The plurality of contact portions 58 may not be necessarily arranged at equal intervals. It is, however, preferable to arrange the plurality of contact portions 58 at equal intervals, since this configuration allows the stacked body 116 to be pressed with a uniform pressing force by the first plate portion 574IN.

What is claimed is:

1. A fuel cell, comprising:
   a stacked body that includes at least a power generation body configured by stacking a plurality of unit cells; and
   an end plate that is placed on an outside of at least one end of the stacked body in a stacking direction, wherein
   the stacked body includes a manifold that is formed to pass through at least the power generation body in the stacking direction and through which a reactive gas or an off-gas flows, and
   the end plate comprises:
      a through hole that is in communication with the manifold, the through hole having an aperture area which is larger than that of the manifold; and
      a plate portion that is placed inside of the through hole at a position corresponding to an outer circumference of an opening of the manifold formed in an end face of the one end of the stacked body and is arranged away from the end face of the stacked body across a clearance and is arranged such that a surface of the plate portion extends along the stacking direction.

2. The fuel cell according to claim 1,
   wherein the end plate comprises at least one contact portion that is provided on a side face of the plate portion and includes a contact side face that is in contact with the end face of the stacked body, wherein the contact side face has a length that is shorter than length of the side face of the plate portion.

3. The fuel cell according to claim 2,
   wherein the end plate comprises a plurality of the contact portions, wherein the plurality of contact portions respectively have an identical length of the contact side faces and are arranged at equal intervals.

4. The fuel cell according to claim 1,
   wherein the plate portion is arranged at a position corresponding to a lower side in gravity direction of the outer circumference of the opening of the manifold in a state that the fuel cell is installed.

5. The fuel cell according to claim 1,
   wherein the plate portion is arranged at a position corresponding to the outer circumference of the opening of the manifold that is configured to cause a cathode off-gas to flow through.

6. The fuel cell according to claim 2,
   wherein the end plate comprises, as the plate portion,
   a cathode gas plate portion that is arranged at a position corresponding to the outer circumference of the opening of the manifold through which a cathode gas flows; and
   a cathode off-gas plate portion that is arranged at a position corresponding to the outer circumference of the opening of the manifold through which a cathode off-gas flows, wherein
   the contact portion is provided on a side face of the cathode gas plate portion.

7. The fuel cell according to claim 1,
   wherein the end plate comprises a metal portion made of a metal and a resin portion made of a resin, and
   the plate portion is made of a resin.

8. A fuel cell system comprising the fuel cell according to claim 1.

* * * * *